(12) United States Patent
Hittle et al.

(10) Patent No.: US 7,975,601 B2
(45) Date of Patent: Jul. 12, 2011

(54) ENGINE CYLINDER LINER

(75) Inventors: Craig Phillip Hittle, Peoria, IL (US);
Michael Patrick Harmon, Dunlap, IL
(US); Nathan Roger Bjerk, Chillicothe,
IL (US)

(73) Assignee: Caterpillar Inc., Peoria, IL (US)

( * ) Notice: Subject to any disclaimer, the term of this patent is extended or adjusted under 35 U.S.C. 154(b) by 445 days.

(21) Appl. No.: 12/285,983

(22) Filed: Oct. 17, 2008

(65) Prior Publication Data

US 2010/0095838 A1    Apr. 22, 2010

(51) Int. Cl.
*F16J 10/04* (2006.01)
(52) U.S. Cl. .................................. 92/171.1; 92/169.2
(58) Field of Classification Search ............... 92/169.2, 92/171.1; 123/193.2
See application file for complete search history.

(56) References Cited

U.S. PATENT DOCUMENTS

| | | | |
|---|---|---|---|
| 1,512,570 A | 10/1924 | Andrews | |
| 1,562,555 A | 11/1925 | Harley | |
| 3,340,774 A | 9/1967 | Brenneke | |
| 3,765,385 A | 10/1973 | Conrad | |
| 4,023,613 A | 5/1977 | Uebayasi et al. | |
| 4,244,330 A | 1/1981 | Baugh et al. | |
| 4,495,907 A | 1/1985 | Kamo | |
| 5,957,103 A | 9/1999 | Takami et al. | |
| 6,167,847 B1 | 1/2001 | Ergezen et al. | |
| 6,487,999 B2 | 12/2002 | Ha | |
| 6,886,520 B2 | 5/2005 | Nozaki et al. | |
| 7,273,029 B2 | 9/2007 | Oda et al. | |
| 2007/0012179 A1 | 1/2007 | Takami et al. | |
| 2007/0107689 A1 | 5/2007 | Oogake et al. | |

*Primary Examiner* — Michael Leslie
(74) *Attorney, Agent, or Firm* — Finnegan, Henderson, Farabow, Garrett & Dunner LLP

(57) ABSTRACT

An engine cylinder liner is provided. The engine cylinder liner includes a first liner end, a second liner end, and an inner surface extending between the first liner end and the second liner end. The engine cylinder liner also includes a first outer surface between the first liner end and a first outer surface end portion, and a second outer surface between the second liner end and a second outer surface end portion. The second outer surface end portion is closer to the first liner end, than the first outer surface end portion is to the first liner end. The engine cylinder liner further includes an inclined shoulder surface portion between the first and second outer surface end portions.

20 Claims, 4 Drawing Sheets

ENGINE CYLINDER LINER

TECHNICAL FIELD

The present disclosure relates generally to an engine and, more particularly, to an engine cylinder liner.

BACKGROUND

Engine cylinder liners are typical components utilized in modern engines, such as internal combustion gasoline engines and diesel engines. An engine cylinder liner includes a bore defined by a longitudinally extended inner surface to accommodate a piston disposed therein. The piston can reciprocate within the bore due to a clearance between an outer surface of the piston and the inner surface of the cylinder liner. A head of the piston and an end of the bore may define a combustion chamber, the volume of which may vary as the piston moves back and forth within the bore. Fuel injected into the combustion chamber is compressed, ignited, and combusted at different engine cycles defined by the movement of the piston.

In many applications, the engine cylinder liners are disposed within an engine block. An engine head assembly is typically disposed on the engine block adjacent one end of the engine cylinder liners. As a result, the engine cylinder liners may be subject to a compression load due to the presence of the engine head assembly. Some portions of an engine cylinder liner may undergo radial deformation under the compression load. The radial deformation of the cylinder liner may distort the otherwise straight profile of the inner surface of the cylinder liner. At some locations, the diameter of the bore may be reduced due to inward deformation of the inner surface of the cylinder liner. The inward deformation of the inner surface may require an increase in the piston ring endgap to avoid piston seizure. However, the increase in the piston ring endgap may reduce the sealing effect and result in an increase in engine oil consumption and contamination, and an increase in the need for breather and filtration capacity in a crankcase ventilation system associated with the engine. Combustion efficiency may also be reduced.

A cast iron cylinder liner is described in U.S. Pat. No. 7,273,029 (the '029 patent) issued to Oda et al. on Sep. 25, 2007. The cast iron cylinder liner includes a plurality of grooves formed on an outer surface of the cylinder liner. Each of the grooves has a ring or spiral shape, extending in a circumferential direction of the cylinder liner. A plurality of such cylinder liners may be placed in a mold, and an aluminum alloy cylinder block may then be cast integrally with the liner. According to the '029 patent, such a cylinder liner design with grooves may reduce residual stress in the cylinder block, thereby preventing the cylinder block from cracking. Also according to the '029 patent, thermal expansion of such a cylinder liner can be controlled to be uniform, which may make it possible to maintain the inner surface in a cylindrical shape and minimize friction caused by a piston reciprocating within the cylinder block.

Although the cylinder liner disclosed in the '029 patent may alter thermal expansion characteristics and help maintain the cylindrical inner surface, reduce engine oil consumption, and reduce abrasion of the piston ring, the cylinder liner may be problematic in some applications. For example, the cylinder liner of the '029 patent may not adequately account for inward radial deformation due to any compressive load that may be applied at a top portion of the cylinder liner, e.g., by an engine head assembly placing a compressive force on the cylinder liner, distorting the shape of the cylindrical inner surface and causing additional abrasion of the piston ring, increased engine oil consumption, and reduced combustion efficiency.

The present disclosure is directed toward improvements in the existing technology.

SUMMARY

In one aspect, the present disclosure is directed to an engine cylinder liner. The engine cylinder liner includes a first liner end, a second liner end, and an inner surface extending between the first liner end and the second liner end. The engine cylinder liner also includes a first outer surface between the first liner end and a first outer surface end portion, and a second outer surface between the second liner end and a second outer surface end portion. The second outer surface end portion is closer to the first liner end, than the first outer surface end portion is to the first liner end. The engine cylinder liner further includes an inclined shoulder surface portion between the first and second outer surface end portions.

In another aspect, the present disclosure is directed to a method of assembling an engine cylinder liner within an engine block. The engine cylinder liner includes a first liner end, a second liner end, and an inner surface extending between the first liner end and the second liner end. The engine cylinder liner also includes at least a first section having a first outer surface between the first liner end and a first outer surface end portion, and at least a second section having a second outer surface between the second liner end and a second outer surface end portion. The second outer surface end portion is closer to the first liner end, than the first outer surface end portion is to the first liner end. The engine cylinder liner further includes an inclined shoulder surface portion between the first and second outer surface end portions. The method includes inserting the second section of the engine cylinder liner into an engine cylinder bore in the engine block, the engine cylinder bore including a first portion sized to accommodate at least part of the first section of the engine cylinder liner, and a second portion sized to accommodate at least part of the second section of the engine cylinder liner, and the engine block including a ledge portion between the first portion and the second portion of the engine cylinder bore. The method also includes moving the engine cylinder liner within the engine cylinder bore until the second section of the engine cylinder liner is within the second portion of the engine cylinder bore. The method further includes continuing moving of the engine cylinder liner within the engine cylinder bore until the shoulder surface portion engages with the ledge portion.

DETAILED DESCRIPTION

Figure 1:
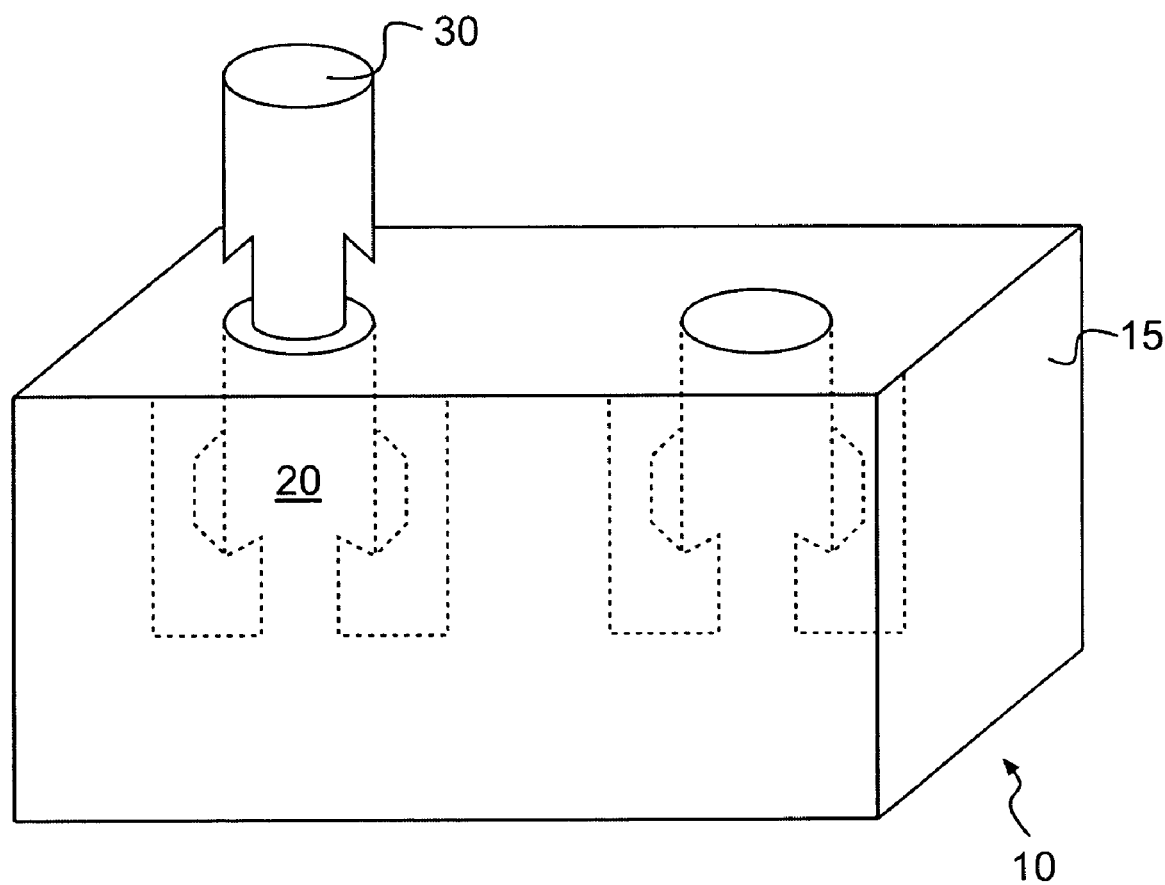
FIG. 1 is a schematic illustration of an exemplary engine in which the disclosed cylinder liner may be employed.

FIG. 1 is a schematic illustration of an exemplary engine 10 in which the disclosed cylinder liner may be employed. Engine 10 may include an engine block 15 including at least one engine cylinder bore 20 configured to accommodate at least one engine cylinder liner 30. The engine cylinder liner 30 may have any suitable cross-sectional shape, such as a cylindrical shape, for example.

Figure 2:
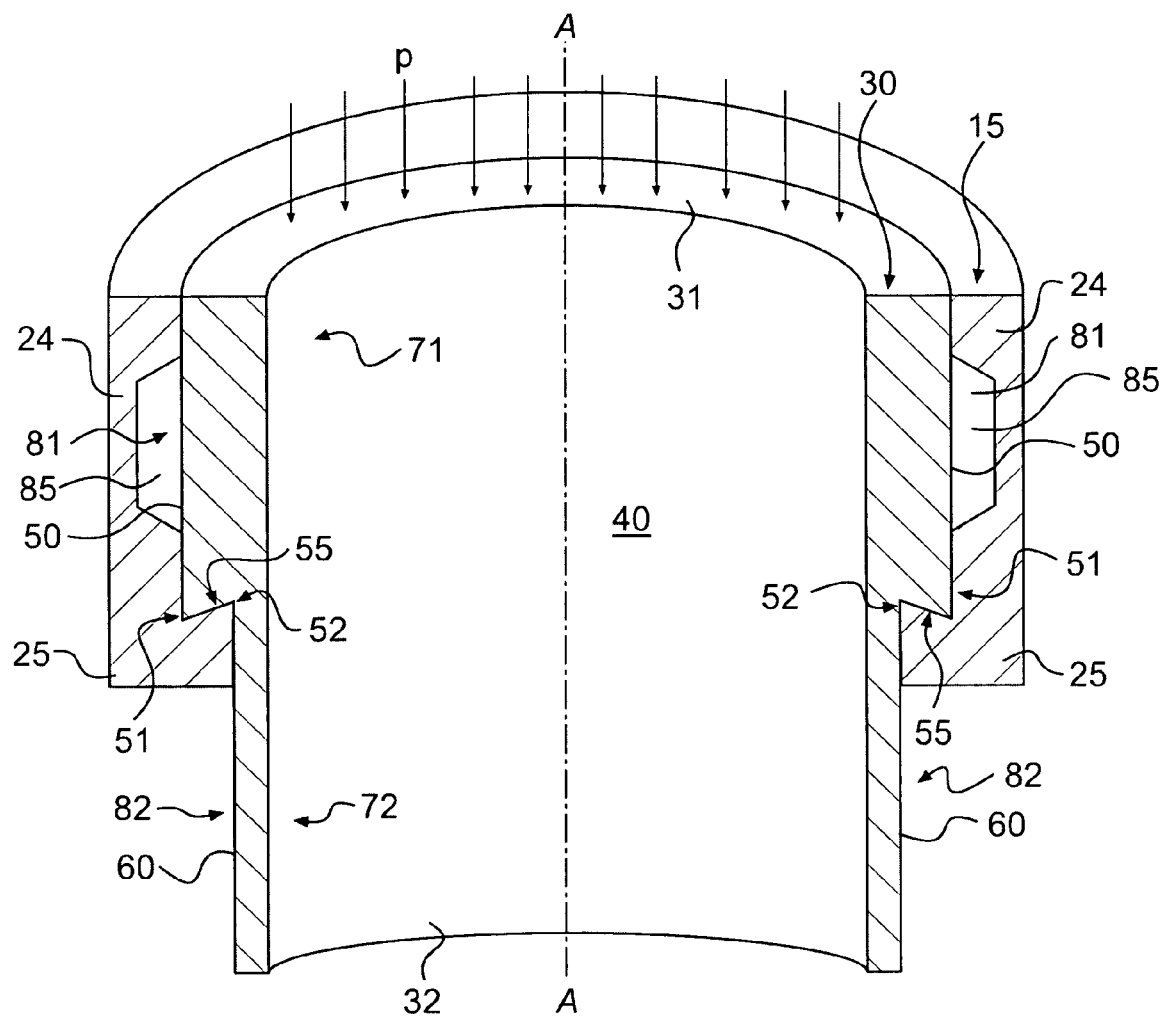
FIG. 2 is a schematic illustration of a cut-away view of an exemplary disclosed engine cylinder liner and a portion of an engine block.

FIG. 2 is a schematic illustration of a cut-away view of an exemplary engine cylinder liner 30 and a portion of the engine block 15. The engine cylinder liner 30 may include a first liner end 31 and a second liner end 32. The engine cylinder liner 30 may also include an inner surface 40 extending between the first liner end 31 and the second liner end 32. The inner surface 40 may be substantially straight along a central axis A-A of the engine cylinder liner 30, and may have any suitable shape, e.g., a cylindrical shape. The outer surface portion of the engine cylinder liner 30 may include at least a first section 71 and a second section 72. The first section 71 may include a first outer surface 50, and the second section 72 may include a second outer surface 60. The outer diameter of the engine cylinder liner 30 measured at least at a portion of the first outer surface 50 may be larger than the outer diameter measured at some portions of the second outer surface 60. In some embodiments, as shown in FIG. 2, the engine cylinder liner 30 may have a uniform outer diameter at the first outer surface 50 that is larger than a uniform outer diameter at the second outer surface 60. Although shown in FIG. 2 as having a cylindrical shape, it is contemplated that the first and second outer surfaces 50 and 60 may each include a plurality sections, and may each have irregular shapes. Therefore, the first and second outer surfaces 50 and 60 may not be in parallel with the central axis A-A, and each may not have a uniform outer diameter.

The engine cylinder bore 20 within the engine block 15 may include a first portion 81 sized to accommodate at least a part of the first section 71 of the engine cylinder liner 30. The engine cylinder bore 20 may also include a second portion 82 sized to accommodate at least a part of the second section 72 of the engine cylinder liner 30. The engine block 15 may include a recessed portion 24. There may be a space 85 between the recessed portion 24 and the first outer surface 50 of the engine cylinder liner 30. The space 85 may be used to accommodate a cooling fluid (not shown) for cooling the engine cylinder liner 30. The engine block 15 may also include a ledge portion 25, which may engage with a portion of the engine cylinder liner 30 and may provide support to the engine cylinder liner 30.

The first outer surface 50 may be located between a first outer surface end portion 51 and the first liner end 31. The second outer surface 60 may be located between a second outer surface end portion 52 and the second liner end 32. As shown in FIG. 2, the second outer surface end portion 52 may be closer to the first liner end 31, while the first outer surface end portion 51 may be closer to the second liner end 32. The engine cylinder liner 30 may also include an inclined shoulder surface portion 55 between the first and second outer surface end portions 51 and 52.

Figure 3A:
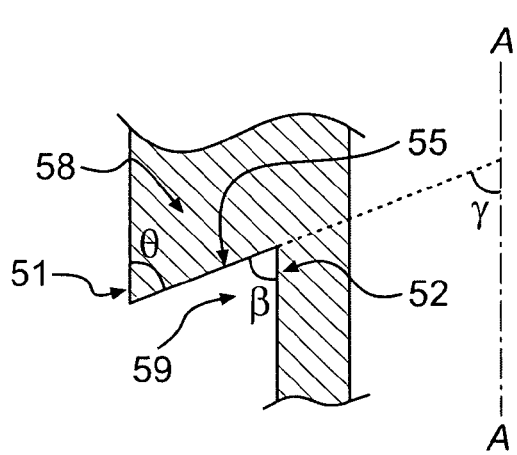
FIG. 3A is a schematic illustration of a portion of an exemplary disclosed engine cylinder liner.

As shown in FIG. 3A, the inclined shoulder surface portion 55 and the first outer surface end portion 51 may form an angle θ. Similarly, the inclined shoulder surface portion 55 and the second outer surface end portion 52 may form an angle β. The angles θ and β may be equal, or they may be different. For example, when the first outer surface end portion 51 that form the angle θ with the shoulder surface portion 55 is in parallel with the central axis A-A, and the shoulder surface portion 55 has a straight profile, as shown in FIG. 2, the angles θ and β may be equal. In some embodiments that are not shown in FIG. 2, for example, when the first outer surface end portion 51 and/or the second outer surface end portion 52 are not in parallel with the central axis A-A, the angles θ and β may not be equal. In some embodiments, such as the embodiment shown in FIG. 2, the angles θ and β may be acute angles, i.e., angles between 0 and 90 degrees. It is contemplated that in some other embodiments, the angles θ and β may be equal to or greater than 90 degrees.

Figure 3B:
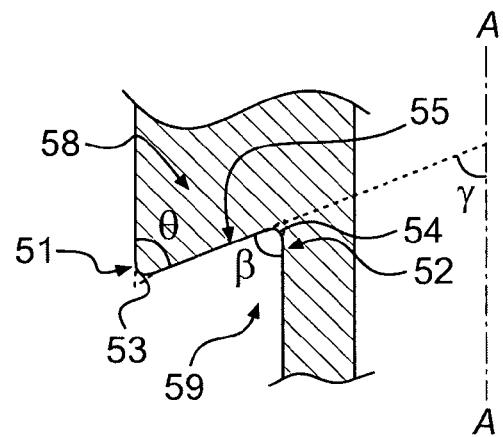
FIG. 3B is a schematic illustration of a portion of an exemplary disclosed engine cylinder liner.

Inclined shoulder surface portion 55 may be directly connected to the first outer surface end portion 51, and the second outer surface end portion 52, as shown in FIG. 3A. In some embodiments, as shown in FIG. 3B, the first outer surface end portion 51 and the inclined shoulder surface portion 55 may be connected through a first connecting portion 53. The first connecting portion 53 may be a surface having a straight profile (not shown), a plurality of surfaces having a plurality of straight profiles (not shown), a curved surface, as shown in FIG. 3B, or a plurality of curved surfaces (not shown). In some embodiments, the extension lines of the first outer surface end portion 51 and the shoulder surface portion 55 may form an angle θ, as shown by the dotted lines in FIG. 3B. As discussed above, the angle θ may be an acute angle, or may be equal to or greater than 90°. Similarly, the second outer surface end portion 52 and the inclined shoulder surface portion 55 may be connected through a second connecting portion 54. The second connecting portion 54 may be similar to the first connecting portion 53, as described above. In some embodiments, the extension lines (dotted lines) of the second outer surface end portion 52 and the shoulder surface portion 55 may form an angle β, as shown in FIG. 3B. As discussed above, the angle β may be an acute angle, or may be equal to or greater than 90°. The inclined shoulder surface portion 55 may form a conically-shaped protruding portion 58 with the first outer surface end portion 51, and may form a conically-shaped recess portion 59 with the second outer surface end portion 52, as shown in FIGS. 3A and 3B.

Figure 3C:
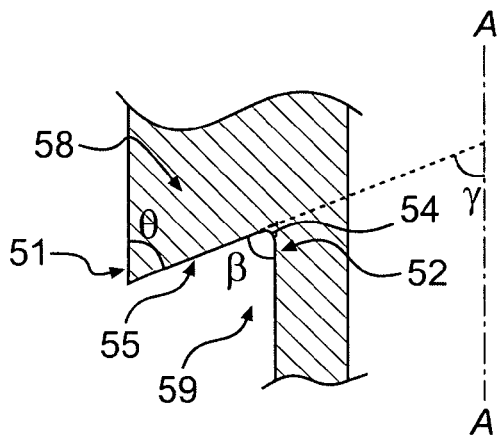
FIG. 3C is a schematic illustration of a portion of an exemplary disclosed engine cylinder liner.
Figure 3D:
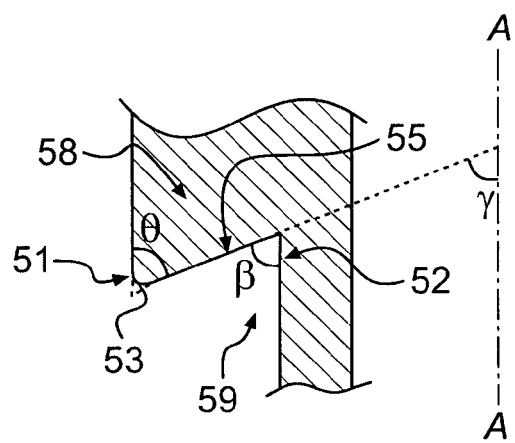
FIG. 3D is a schematic illustration of a portion of an exemplary disclosed engine cylinder liner.

In some embodiments, as shown in FIG. 3C, the first outer surface end portion 51 may be directly connected with the inclined shoulder surface portion 55 to form an angle θ, while the second outer surface end portion 52 may be connected with the inclined shoulder surface portion 55 through the second connecting portion 54. The extension lines (dotted lines) of the inclined shoulder surface portion 55 and the second outer surface end portion 52 may form an angle β. In other embodiments, as shown in FIG. 3D, the second outer surface end portion 52 may be directly connected with the inclined shoulder surface portion 55 to form an angle β, while the first outer surface end portion 51 may be connected with the shoulder surface portion 55 through the first curved connecting portion 53. The extension lines (dotted lines) of the inclined shoulder surface portion 55 and the first outer surface end portion 51 may form an angle θ.

Figure 3E:
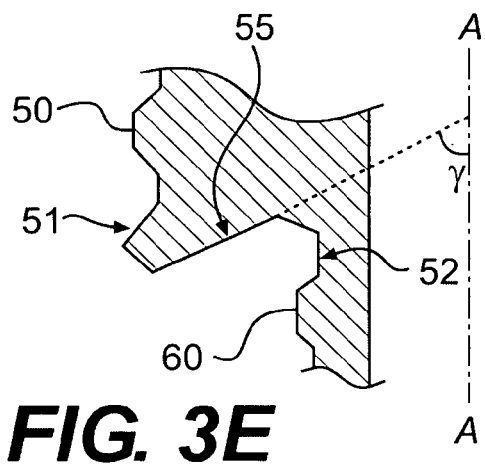
FIG. 3E is a schematic illustration of a portion of an exemplary disclosed engine cylinder liner.

FIG. 3E illustrates that in some embodiments, the first and second outer surfaces 50 and 60 may include irregular shapes. And the shoulder surface portion 55 may be connected with the first and second outer surface end portions 51 and 52 through any suitable connecting portions with any suitable shapes. In all the embodiments shown in FIGS. 3A-3E, an extension line of the shoulder surface portion 55 may form an angle γ with the central axis A-A. The angle γ may be an acute angle.

Figure 4A:
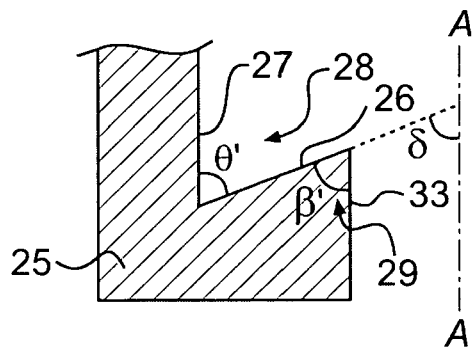
FIG. 4A is a schematic illustration of a ledge portion of an exemplary engine block.

FIG. 4A shows an exemplary ledge portion 25 of the engine block 15. The ledge portion 25 may provide support to the engine cylinder liner 30. The shoulder surface portion 55 may engage with the ledge portion 25 when the engine cylinder liner 30 is assembled into the engine cylinder bore 20 of the engine block 15. The ledge portion 25 may have a conically-shaped recess portion 28 and a conically-shaped protruding portion 29. The conically-shaped recess portion 28 may include a first ledge portion surface 26 and a second ledge portion surface 27. Similar to the shoulder surface portion 55, the first ledge portion surface 26 may be inclined with respect to a horizontal axis (not shown) perpendicular to the central axis A-A, and an extension line of which may form an angle δ with the central axis A-A, as shown in FIG. 4A. The angle δ may be an acute angle, and may be equal to or smaller than the angle γ, which is the angle the inclined shoulder surface portion 55 forms with respect to the central axis A-A. For example, if the angle γ is 85 degrees, the angle δ may be 85 degrees or smaller, e.g., 84 degrees.

Figure 4B:
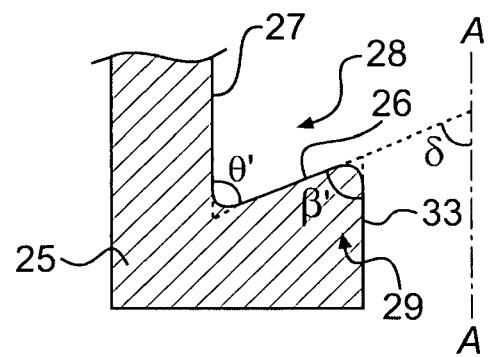
FIG. 4B is a schematic illustration of a ledge portion of an exemplary engine block.
Figure 4C:
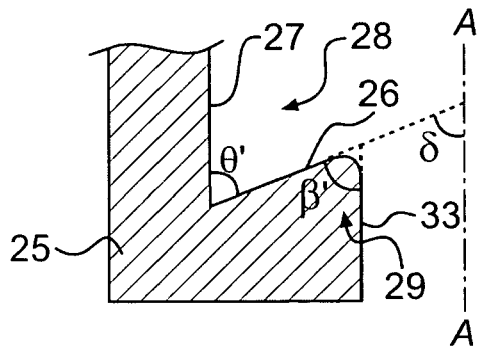
FIG. 4C is a schematic illustration of a ledge portion of an exemplary engine block.
Figure 4D:
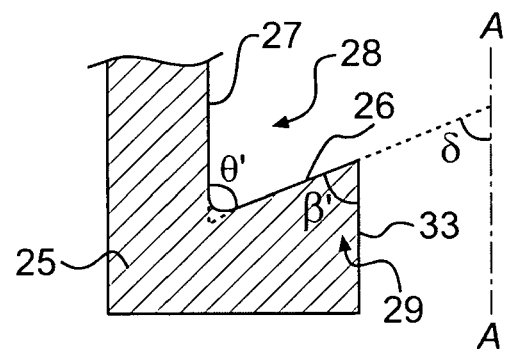
FIG. 4D is a schematic illustration of a ledge portion of an exemplary engine block.

The conically-shaped recess portion 28 of the ledge portion 25 may engage with the conically-shaped protruding portion 58 of the engine cylinder liner 30. The conically-shaped protruding portion 29 of the ledge portion 25 may engage with the conically-shaped recess portion 59 of the engine cylinder liner 30. The designs of the conically-shaped recess portion 28 and the conically-shaped protruding portion 29 may match the corresponding designs of the conically-shaped protruding portion 58 and the conically-shaped recess portion 59 respectively. That is, for example, in order to engage with the conically-shaped protruding portion 58 of the engine cylinder liner 30 shown in FIG. 3A, the conically-shaped recess portion 28 may be designed to also include an angle θ' formed by the first ledge portion surface 26 and the second ledge portion surface 27, and an angle β' formed by the first ledge portion 26 and a third ledge portion surface 33, as shown in FIG. 4A. The angles θ' and β' may or may not be equal to θ and β respectively. For another example, if the first outer surface end portion 51 and the inclined shoulder surface portion 55 are connected through the first connecting portion 53 as shown in FIG. 3B, the connecting portion between the first and second ledge portion surfaces 26 and 27 may be correspondingly designed to match the first connecting portion 53, as shown in FIG. 4B. Other embodiments of the ledge portion 25 corresponding to the embodiments of the engine cylinder liner 30 shown in FIGS. 3C and 3D are shown in FIGS. 4C and 4D. Similar to the angles θ and β, the angles θ' and β' may be acute angles, or may be equal to or greater than 90 degrees, depending on the design of the engine cylinder liner 30.

Referring back to FIG. 2, as mentioned previously, an engine head assembly (not shown) may be placed over the engine cylinder liner 30, and may exert a compression force p on the engine cylinder liner 30 at the first liner end 31. Some portions of the first section 71 of the engine cylinder liner 30 may deform inwardly under the compression force p. This inward deformation potentially may cause piston seizure in a conventional engine cylinder liner since the diameter of the inner surface 40 may be reduced. The disclosed engine cylinder liner and the associated engine block design may reduce engine cylinder liner inward deformation resulting from any compression force exerted by the engine head assembly.

Figure 5:
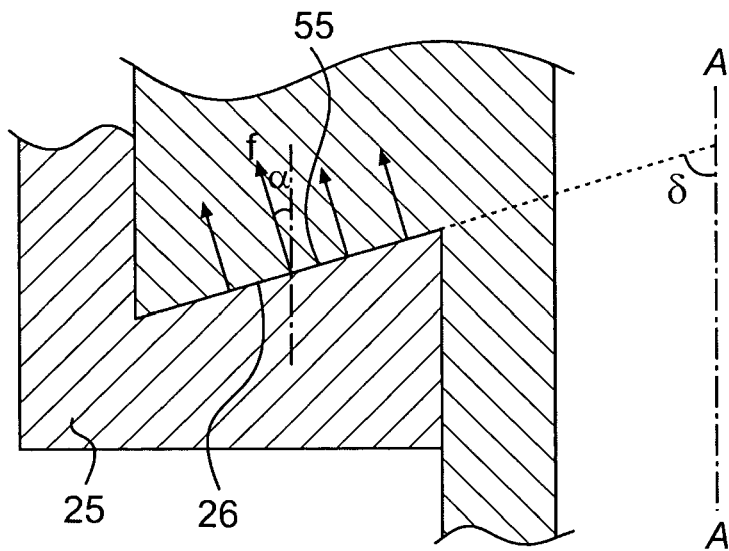
FIG. 5 is a schematic illustration of a supporting force provided by an exemplary ledge portion to an exemplary engine cylinder liner.

Referring to FIG. 5, the ledge portion 25 may provide a supporting force f to the engine cylinder liner 30 through the first ledge portion surface 26, which is engaged with the shoulder surface portion 55. As shown in FIG. 5, the supporting force f may be directed outwardly away from the central axis A-A of the engine cylinder liner 30. In some embodiments, the direction of the supporting force f may form an angle α, which may be approximated as 90°−δ, with respect to a line in parallel with the central axis A-A of the engine cylinder liner 30. Such a supporting force f may be decomposed into a first component force in the horizontal direction, perpendicular to the central axis A-A, and a second component force in the vertical direction, in parallel with the central axis A-A. The first component force in the horizontal direction will be non-zero, and will tend to cause the first section 71 of the engine cylinder liner 30 to deform outwardly, thereby countering and preventing or reducing inward deformation of the first section 71. The desired reduction in the inward deformation of the first section 71 may be selected through design of the ledge portion 25 and the corresponding parts of the engine cylinder liner 30, depending on the type of engine. In some embodiments, the angle δ may be designed to be smaller (e.g., 0.5 or 1 degree smaller) than the angle γ based on a desired outward deformation of the engine cylinder liner 30 and/or a desired interlocking effect between the engine cylinder liner 30 and the ledge portion 25.

INDUSTRIAL APPLICABILITY

Referring to FIGS. 1-5, the engine cylinder liner 30 may provide a surface for guiding movement of an engine piston (not shown) disposed therein, and may partially form a chamber for combusting fuel. Engine block 15 may support and secure the engine cylinder liner 30 therein. The ledge portion 25 may provide a supporting force f through the inclined first ledge portion surface 26 to the engine cylinder liner 30. The supporting force f may exert an outward deforming tendency on the engine cylinder liner 30, thus preventing or reducing the inward deforming tendency of the engine cylinder liner 30 due to the compression force p applied by the engine head assembly (not shown).

When the engine cylinder liner 30 is to be assembled within the engine block 15, an operator may insert the second section 72 of the engine cylinder liner 30 into the engine cylinder bore 20 of the engine block 15. The operator may move the engine cylinder liner 30 within the engine cylinder bore 20 until the second section 72 of the engine cylinder liner 30 is within the second portion 82 of the engine cylinder bore 20. The operator may continue the moving of the engine cylinder liner 30 until the shoulder surface portion 55 engages with the ledge portion 25.

It will be apparent to those skilled in the art that various modifications and variations can be made in the disclosed engine cylinder liner. Other embodiments will be apparent to those skilled in the art from consideration of the specification and practice of the disclosed embodiments herein. It is intended that the specification and examples be considered as exemplary only, with a true scope of the disclosure being indicated by the following claims.

What is claimed is:

1. An engine cylinder liner, comprising:
   a first liner end;
   a second liner end;
   an inner surface extending between the first liner end and the second liner end;

a first outer surface between the first liner end and a first outer surface end portion;

a second outer surface between the second liner end and a second outer surface end portion, wherein the second outer surface end portion is closer to the first liner end, than the first outer surface end portion is to the first liner end; and an inclined shoulder surface portion between the first and second outer surface end portions.

2. The engine cylinder liner of claim 1, wherein the inclined shoulder surface portion forms an acute angle with respect to a central axis of the engine cylinder liner.

3. The engine cylinder liner of claim 1, wherein the inclined shoulder surface portion is directly connected with the first outer surface end portion and forms an acute angle with the first outer surface end portion.

4. The engine cylinder liner of claim 1, wherein the inclined shoulder surface portion is directly connected with the second outer surface end portion and forms an acute angle with the second outer surface end portion.

5. The engine cylinder liner of claim 1, wherein the inclined shoulder surface portion is connected with at least one of the first outer surface end portion and the second outer surface end portion through a connecting portion, and wherein an extension line of the inclined shoulder surface portion forms an acute angle with an extension line of at least one of the first outer surface end portion and the second outer surface end portion.

6. The engine cylinder liner of claim 1, wherein the first outer surface end portion and the inclined shoulder surface portion are connected through a first connecting portion, and wherein extension lines of the second outer surface end portion and the inclined shoulder surface portion form an acute angle.

7. The engine cylinder liner of claim 1, wherein the second outer surface end portion and the inclined shoulder surface portion are connected through a second connecting portion, and wherein extension lines of the first outer surface end portion and the inclined shoulder surface portion form an acute angle.

8. The engine cylinder liner of claim 1, wherein the first outer surface end portion and the inclined shoulder surface portion are connected through a first connecting portion, and the second outer surface end portion and the inclined shoulder surface portion are connected through a second connecting portion, and wherein extension lines of the inclined shoulder surface portion and the first outer surface end portion form an acute angle, and extension lines of the shoulder surface portion and the second outer surface end portion form an acute angle.

9. The engine cylinder liner of claim 1, wherein the shoulder surface portion forms a conical shape with at least one of the first and second outer surface end portions.

10. The engine cylinder liner of claim 1, wherein an outer diameter measured at least at a portion of the first outer surface of the engine cylinder liner is larger than an outer diameter measured at least at a portion of the second outer surface of the engine cylinder liner.

11. The engine cylinder liner of claim 1, wherein the inner surface has a cylindrical shape.

12. A method of assembling an engine cylinder liner within an engine block, the engine cylinder liner including a first liner end, a second liner end, an inner surface extending between the first liner end and the second liner end, at least a first section having a first outer surface between the first liner end and a first outer surface end portion, at least a second section having a second outer surface between the second liner end and a second outer surface end portion, the second outer surface end portion being closer to the first liner end, than the first outer surface end portion is to the first liner end, and an inclined shoulder surface portion between the first and second outer surface end portions, the method comprising:

inserting the second section of the engine cylinder liner into an engine cylinder bore in the engine block, the engine cylinder bore including a first portion sized to accommodate at least part of the first section of the engine cylinder liner, and a second portion sized to accommodate at least part of the second section of the engine cylinder liner, and the engine block including a ledge portion between the first portion and the second portion of the engine cylinder bore;

moving the engine cylinder liner within the engine cylinder bore until the second section of the engine cylinder liner is within the second portion of the engine cylinder bore; and continuing moving of the engine cylinder liner within the engine cylinder bore until the shoulder surface portion engages with the ledge portion.

13. An engine, comprising:
an engine block having an engine cylinder bore and a ledge portion; and
an engine cylinder liner, including:
a first liner end;
a second liner end;
an inner surface extending between the first liner end and the second liner end;
a first outer surface between a first outer surface end portion and the first liner end;
a second outer surface between a second outer surface end portion and the second liner end, wherein the first outer surface end portion is farther from the first liner end, than the second outer surface end portion is from the first liner end; and
a shoulder surface portion between the first and second outer surface end portions, the shoulder surface portion inclined from the first outer surface end portion toward the second outer surface end portion.

14. The engine of claim 13, wherein the engine cylinder liner includes a first section having the first outer surface and a second section having the second outer surface, and wherein the engine cylinder bore includes a first portion sized to accommodate at least part of the first section of the engine cylinder liner, and a second portion sized to accommodate at least part of the second section of the engine cylinder liner.

15. The engine of claim 13, wherein the inclined shoulder surface portion forms an acute angle with at least one of the first and second outer surface end portions.

16. The engine of claim 13, wherein at least one of the first and second outer surface end portions is connected with the inclined shoulder surface portion through at least one of a first and a second connecting portion corresponding respectively to the first and second outer surface end portions, and wherein an extension line of the inclined shoulder surface portion forms an acute angle with extension lines of at least one of the first and second outer surface end portions.

17. The engine of claim 13, wherein the shoulder surface portion forms a conically-shaped protruding portion with the first outer surface end portion and a conically-shaped recess portion with the second outer surface end portion, and the ledge portion includes a conically-shaped recess portion configured to engage with the conically-shaped protruding portion formed by the shoulder surface portion and the first outer surface end portion, and a conically-shaped protruding portion configured to engage with the conically-shaped recess portion formed by the shoulder surface portion and the second outer surface end portion.

18. The engine of claim 13, wherein the inclined shoulder surface portion forms an acute angle with respect to a central axis of the engine cylinder liner.

19. The engine of claim 18, wherein the ledge portion includes a first ledge portion surface configured to be engaged with the inclined shoulder surface portion of the engine cylinder liner and form an acute angle with respect to the central axis of the engine cylinder liner.

20. The engine of claim 19, wherein the acute angle formed by the first ledge portion surface and the central axis is smaller than the acute angle formed by the shoulder surface portion and the central axis.

* * * * *